United States Patent
Matsumoto

(10) Patent No.: US 7,434,454 B2
(45) Date of Patent: Oct. 14, 2008

(54) METHOD AND APPARATUS FOR TIRE UNIFORMITY MEASUREMENT

(75) Inventor: Sigeru Matsumoto, Tokyo (JP)

(73) Assignee: Kokusai Keisokuki Kabushiki Kaisha, Tokyo (JP)

( * ) Notice: Subject to any disclaimer, the term of this patent is extended or adjusted under 35 U.S.C. 154(b) by 419 days.

(21) Appl. No.: 10/569,333

(22) PCT Filed: Aug. 25, 2004

(86) PCT No.: PCT/JP2004/012597

§ 371 (c)(1),
(2), (4) Date: Feb. 21, 2006

(87) PCT Pub. No.: WO2005/019791

PCT Pub. Date: Mar. 3, 2005

(65) Prior Publication Data

US 2006/0272408 A1 Dec. 7, 2006

(30) Foreign Application Priority Data

Aug. 25, 2003 (JP) ............................. 2003-300241

(51) Int. Cl.
*G01M 17/02* (2006.01)
*E01C 23/00* (2006.01)

(52) U.S. Cl. ............................. 73/146; 451/1; 702/105; 73/462

(58) Field of Classification Search ............. 73/462, 73/146; 451/1, 28; 702/105
See application file for complete search history.

(56) References Cited

U.S. PATENT DOCUMENTS

| | | | | | |
|---|---|---|---|---|---|
| 2,276,687 | A | * | 3/1942 | Cleveland et al. | 156/408 |
| 4,078,339 | A | * | 3/1978 | Ongaro | 451/28 |
| 4,128,969 | A | * | 12/1978 | Gormish et al. | 451/1 |
| 4,423,632 | A | * | 1/1984 | Madden et al. | 73/462 |
| 5,309,377 | A | * | 5/1994 | Beebe | 702/105 |
| 5,614,676 | A | * | 3/1997 | Dutt et al. | 73/660 |
| 6,035,709 | A | * | 3/2000 | Barnette, Jr. | 73/146 |
| 6,651,716 | B1 | * | 11/2003 | Brown et al. | 152/564 |

FOREIGN PATENT DOCUMENTS

| EP | 1 126 267 A2 | 8/2001 |
|---|---|---|
| EP | 123 9275 A2 | 9/2002 |

* cited by examiner

*Primary Examiner*—Hezron E. Williams
*Assistant Examiner*—Samir M. Shah
(74) *Attorney, Agent, or Firm*—Day Pitney LLP

(57) ABSTRACT

There is provided a method and a apparatus for measuring tire uniformity. The apparatus comprises a spindle, a rotating drum, a sensor and a computing means. The method comprises the steps of mounting a tire on the spindle, pressing a circumferential surface of a rotating drum against the tread surface of the tire with a first pressing force, rotating the tire around rotational axis thereof, and computing the forces which the tire acts on first and second planes of the tire by the computing means while the tire is rotating. The first plane is perpendicular to the rotational axis and in one sidewall side of the tire. The second plane is perpendicular to the rotational axis and in the other sidewall side of the tire. The forces are computed based on values obtained by the sensor measuring forces transmitted to the spindle from the tire at first and second positions. The first and second positions have different distances from the tire in the rotational axis direction.

17 Claims, 4 Drawing Sheets

METHOD AND APPARATUS FOR TIRE UNIFORMITY MEASUREMENT

FIELD OF THE INVENTION

This invention relates to a method and an apparatus for tire uniformity measurement.

BACKGROUND OF THE INVENTION

Ideally, a tire is desirable to be a perfect circle, and interior stiffness, dimensions and weight distribution and other features thereof should be uniform around the circumference of the tire. However, the usual tire construction and manufacturing process make it difficult to mass produce such an ideal tire. That is, a certain amount of nonuniformity in the stiffness, dimensions and weight distribution and other features occur in the produced tire. As a result, an exciting force is produced in the tire while the vehicle is running. The oscillations produced by this exciting force are transmitted to the vehicle chassis and cause a variety of vehicle oscillations and noises including shaking, fluttering, sounds of the tire vibrations being transmitted inside the vehicle, and beat sounds.

One known method for evaluating nonuniformity of a tire is described in Automobile Standards "Uniformity testing methods for automobile tires" (JASO C607). In this method, a rotating drum, which serves as a substitute for the road surface, presses against a rotatably held tire with a predetermined pressing force (several hundred kilograms), or the tire is pressed against the rotating drum with the predetermined pressing force. The tire and the rotating drum are capable of rotating around their respective rotational axes, in such a way that when either one rotates, the other is also caused to rotate.

In this condition, the tire or the rotating drum is rotatably driven so that the tire rotates at 60 [rpm]. As the tire rotates, the exciting force produced by nonuniformity of the tire occurs. This exciting force is measured by one or more means for measuring force (such as a load cell) mounted on a bearing which rotatably supports the tire or the rotating drum, or mounted on a member attached to this bearing. From the measured value, an index that serves to evaluate the nonuniformity of the tire is computed. This measurement is called as a uniformity measurement. The index obtained by means of this uniformity measurement is computed by modeling the tire as a disc (this model will be called as a "disc model" hereinafter) and assuming that the force is concentrated at the center of that disc.

Next, tires on which measurements were performed are classified into those for which the nonuniformity obtained from the index is within tolerable limits and those for which it is not. To the extent possible, tires for which the nonuniformity is outside of the tolerable limits are subjected to processing to decrease the nonuniformity. Tires that have been processed are then subjected to uniformity measurement again; those for which the nonuniformity is within tolerable limits are separated from those for which it is not.

Through the procedure described above, only tires judged to have "nonuniformity within tolerable limits" are selected and shipped to customers (or sent to the next step in the tire evaluation procedure).

Recently, a problem has occurred in that even when nonuniformity as measured by the uniformity measurement method described above is judged to be within tolerable limits, particularly in high speed vehicle operation, an exciting force from a tire is sometimes applied to the vehicle shaft, causing vehicle oscillations and noise inside the vehicle. The cause of these oscillations and noise is considered to be nonuniformity that could not be evaluated from the result of measurement by the conventional uniformity measurement method. Therefore, a nonuniformity measurement method that makes it possible to evaluate the nonuniformity that is causing these phenomena has been desired.

SUMMARY OF THE INVENTION

It is therefore an object of the invention to provide a tire uniformity measurement method for detecting the nonuniformity of a tire, which is capable of evaluating a tire whether the tire causes above-described phenomena.

An aspect of the present invention relates to detect the fluctuation in the exciting force produced by nonuniformity in a tire lateral direction (i.e., a direction of the tire rotational axis). That is, when exciting forces are produced by nonuniformities of opposite phases on both sides of the tire in the lateral direction, these exciting forces of opposite phase canceled each other out during the detection if the measurement is based on the "disc model". These exciting forces of opposite phase may not be cancelled and may be applied to the vehicle shaft. Thus, according to an embodiment of the invention, it becomes possible to detect an index which can pick up tires which may produce vibrations of the vehicle chassis and noise inside the vehicle, even if exciting forces of opposite phases occur on the two sides of the tire in the lateral direction.

According to an embodiment of the invention, there is provided a tire uniformity measurement method which comprises the steps of mounting a tire on a spindle of a uniformity measurement apparatus, pressing a circumferential surface of a rotating drum against the tread surface of the tire with a first pressing force, rotating the tire around rotational axis thereof, and computing the forces which the tire acts on first and second planes of the tire while the tire is rotating. The first plane is perpendicular to the rotational axis and in one sidewall side of the tire. The second plane is perpendicular to the rotational axis and in the other sidewall side of the tire. The forces are computed based on a measured values obtained by measuring forces transmitted to the spindle from the tire at first and second positions. The first and second positions have different distances from the tire in the rotational axis direction.

Optionally, the first plane includes the one sidewall of the tire and the second plane includes the other sidewall of the tire.

Optionally, the first pressing force is determined by dividing the weight of a vehicle on which the tire is mounted by the number of tires mounted on the vehicle.

Optionally, the method measures forces by which the tire acts on the first and second planes of the tire while the tire is rotating and the circumferential surface of the rotating drum is pressed against the tread surface of the tire with a second pressing force. The second pressing force produces a friction force between the rotating drum and the tire. The friction force is so large as enough to prevent free rotation of the rotating drum and is smaller than the measurement error of the forces measured at the first and second positions.

Optionally, one of the forces which the tire acts on first and second planes of the tire exceeds a predetermined value when the circumferential surface of the rotating drum is pressed against the tread surface of the tire with the first pressing force, the pressing force with which the circumferential surface of the rotating drum is pressed against the tread surface of the tire is changed into the second pressing force, and the forces which the tire acts on the first and second planes of the tire are measured.

In one embodiment of the present invention, a calibration is performed on uniformity measurement apparatus using the result of measurement of the forces at the first and second positions when a predetermined weight is attached at a predetermined position on the first plane of a balanced tire and when the predetermined weight is attached at a predetermined position on the second plane of a balanced tire.

The other object of the invention is to provide a tire uniformity measurement apparatus for detecting the nonuniformity of a tire, which is capable of evaluating a tire whether the tire causes above-described phenomena.

According to an embodiment of the invention, there is also provided a tire uniformity measurement apparatus, comprising a spindle for rotating a tire around the rotational axis thereof, a rotating drum pressed against the tread of the tire with a first pressing force, a sensor for measuring force transmitted from the tire to the spindle, and a computing means for computing the forces by which the tire acts on first and second plane. The rotating drum is adapted to rotate around the rotational axis thereof as the tire rotates. The sensor measures the force transmitted from the tire to the spindle at a first position and a second position. The first and second positions have different distances from the tire in the rotational axis direction. The force computed by the computing means on the first plane is perpendicular to the rotational axis and in one sidewall side of the tire. The force computed by the computing means on the second plane is perpendicular to the rotational axis and in the second sidewall side of the tire. The computing is performed based on the results of measurements by the sensor.

Optionally, the computing means computes the components of the forces acting on first and second planes, respectively. Each of the components is in the direction tangential to both of the tire and the rotating drum.

Optionally, the first plane includes the one sidewall of the tire and the second plane includes the other sidewall of the tire.

Optionally, the first pressing force is determined by dividing the weight of a vehicle on which the tire is mounted by the number of tires mounted on the vehicle.

Optionally, apparatus measures forces by which the tire acts on the first and second planes of the tire while the tire is rotating and the circumferential surface of the rotating drum is pressed against the tread surface of the tire with a second pressing force. The second pressing force produces a friction force between the rotating drum and the tire. The friction force is so large as enough to prevent free rotation of the rotating drum and is smaller than the measurement error of the forces measured at the first and second positions.

Optionally, one of the forces which the tire acts on first and second planes of the tire exceeds a predetermined value when the circumferential surface of the rotating drum is pressed against the tread surface of the tire with a first pressing force, the pressing force with which the circumferential surface of a rotating drum is pressed against the tread surface of the tire is changed into the second pressing force, and the forces which the tire acts on the first and second planes of the tire are measured.

In one embodiment of the present invention, the apparatus further comprises a tire cutting means for cutting the tire so that the amplitude of fluctuation of the force by which the tire acts on the first plane and the amplitude of fluctuation of the force by which the tire acts on the second plane are decreased. The forces are measured when the rotating drum is pressed against the tread of the tire with the first pressing force.

In one embodiment of the present invention, the apparatus further comprises a tire cutting means for cutting the tire so that the amplitude of fluctuation of the force by which the tire acts on the first plane and the amplitude of fluctuation of the force by which the tire acts on the second plane are decreased. The forces are measured when the rotating drum is pressed against the tread of the tire with the second pressing force.

In one embodiment of the present invention, the apparatus further comprises a marking means for marking the position at which the tire should be cut and the amount by which it should be cut so that the amplitude of fluctuation of the force by which the tire acts on the first plane and the amplitude of fluctuation of the force by which the tire acts on the second plane will be decreased. The forces are measured when the rotating drum is pressed against the tread of the tire with the first pressing force.

In one embodiment of the present invention, the apparatus further comprises a marking means for marking the position at which the tire should be cut and the amount by which it should be cut so that the amplitude of fluctuation of the force by which the tire acts on the first plane and the amplitude of fluctuation of the force by which the tire acts on the second plane will be decreased. The forces are measured when the rotating drum is pressed against the tread of the tire with the second pressing force.

BRIEF DESCRIPTION OF DRAWINGS

The present invention will be understood and appreciated from the following detailed description, taken in conjunction with the drawings in which.

DETAILED DESCRIPTION OF THE EMBODIMENT

Hereinafter, embodiments of the invention will be described.

First Embodiment

Figure 1:
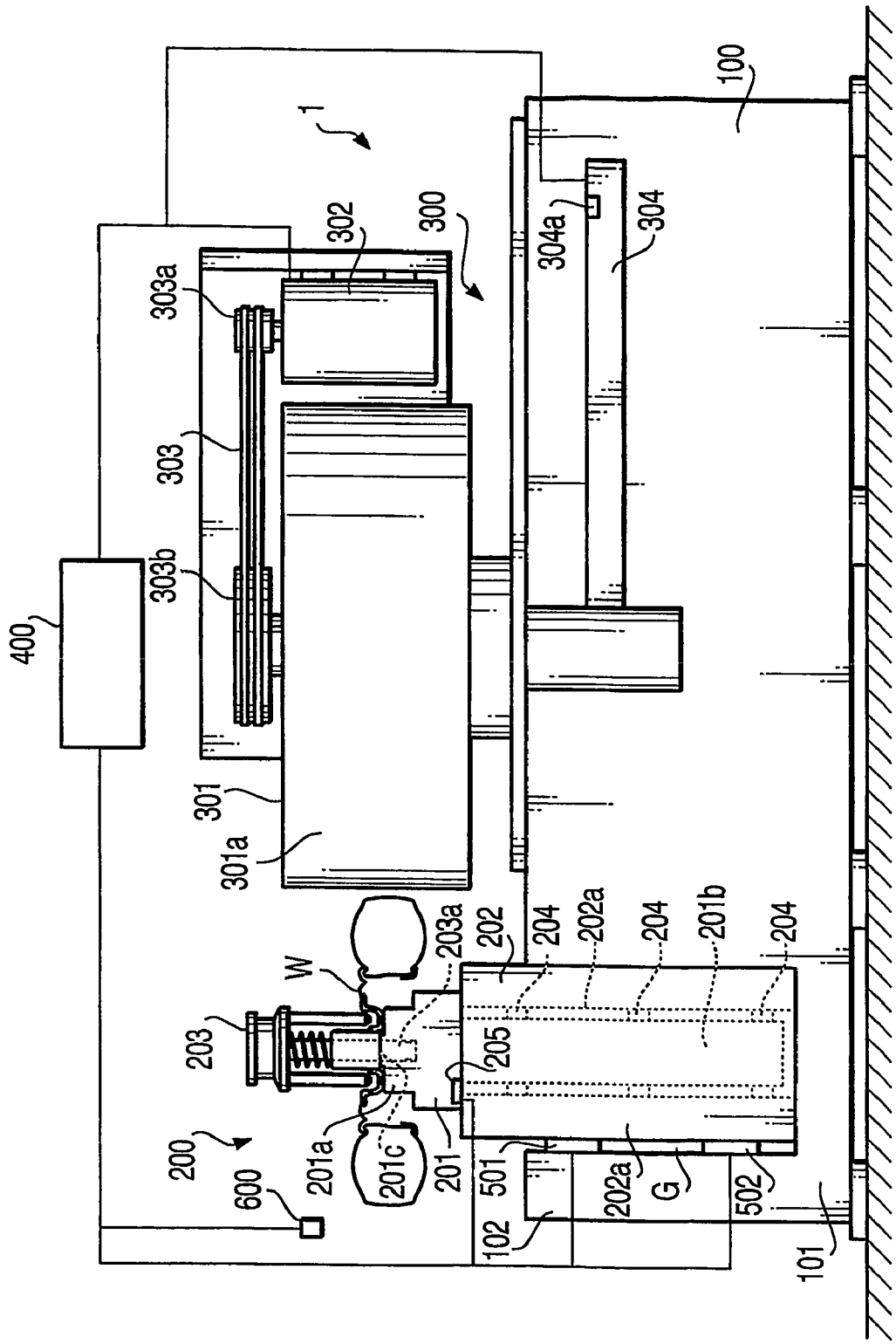
FIG. 1 shows a front view of a high speed tire uniformity measurement apparatus according to an embodiment of this invention.

FIG. 1 shows a front view of a high-speed tire uniformity measurement apparatus which is an embodiment of this invention. The measurement apparatus 1 which is an embodiment of this invention measures the high-speed uniformity of the tire, the uniformity according to JAS 0 C 607 standard, and the tire dynamic balance. In addition, it includes a marking apparatus which can mark the tire for use in removing tire unbalance. Dynamic balance is measured by rotating the tire in free rotation and measuring the centrifugal force that arises at that time. In this invention, the tire is rotated together with a rotating drum, with the rotating drum pressed against the tire tread surface. The pressing force which presses the tire against the rotating drum is set small, to 50 to 80 [kgf]. Among the forces acting on the tire, fluctuation of a component perpendicular to the tire rotational axis and the direction in which the tire is pressed, is measured. These fluctuation does not include the pressing force which presses the tire. In addition, since the pressing force which presses the tire is set to be low, the fluctuation amplitude can be regarded as nearly equivalent to the component in the radial direction of the tire of the centrifugal force received by the tire rotational shaft when the tire rotates freely. Accordingly, the index obtained by using this fluctuation is nearly equivalent to the dynamic balance of the tire computed from the radial component, in the radial direction of the tire, of the centrifugal force received by the tire rotational shaft when the tire is rotated in free rotation.

The measurement apparatus 1 has a spindle section 200 which rotatably holds a wheeled tire W. The spindle section 200 comprises a spindle 201 to which the tire is attached and which rotates together with the tire, a spindle housing 202 which rotatably supports the spindle 201 through the bearing 204, and a top adapter 203 which fixes the tire on the spindle 201.

A through-hole 202a is formed in the spindle housing 202 in the vertical direction, and the spindle 201 is inserted into this through-hole 202a. The spindle 201 comprises a chuck section 201a and a shaft section 201b that extends downward from the chuck section 201a. The shaft section 201a of the spindle 201 is inserted into and engaged with the through-hole 202a in the spindle housing 202 via a plurality of bearings 204. Accordingly, the spindle 201 is rotatably supported by the spindle housing 202.

The top adapter 203 has a shaft 203a which extends vertically downward. This shaft 203a can be inserted into a hole 201c formed in the top surface of the chuck section 201a. The hole 203c in a chuck section 201a is formed so as to be coaxial with the chuck section 201a. In addition, the chuck section 201a is provided with a lock mechanism that locks the shaft 203a in a similar manner as described in the patent disclosure 2003-4597A by the present applicant. The wheeled tire W is placed on the top surface of the chuck section 201a of the spindle 201 so that the hub hole in the tire and the hole 201c in the chuck section 201a are arranged coaxially. Then, the shaft 203a of the top adapter 203 is inserted into the hole 201c so that the top adapter presses the wheel of the tire W toward the top surface of the chuck section 201a. The tire W is then fixed to the spindle 201, so as to become integrated with the spindle 201, by locking the shaft 203a. At this time, the tire W is fixed in place so that the hub hole of the tire W and the spindle 201 become coaxial, by using the mechanism described in patent publication 2003-4597A. As a result, the tire W is able to rotate around its rotational axis. In addition, the rotational rate of the spindle 201 and the phase of the spindle 201 can be detected by a rotary encoder 205 attached to the spindle housing 202. The output from the rotary encoder 205 is sent to a control section 400 of the measurement apparatus 1.

In this embodiment, the wheeled tire W is attached to the spindle, however, it is also possible for a wheelless tire to be retained between the upper rim and the lower rim, and attached to the spindle as in the apparatus described in patent publication 2002-350293A.

The spindle 201 and the tire W attached to the spindle 201, are rotatably driven by a rotating drum section 300.

The rotating drum section 300 has the rotating drum 301. The rotating drum 301 is a cylindrical member which is capable of rotating around its rotational axis. The rotational axis of the rotating drum 301 and the rotational axis of the spindle 201 are substantially parallel. In addition, the rotating drum section 300 has a motor that rotationally drives the rotating drum 301. That is, the rotational motion of the rotational shaft of the motor 302 is transmitted to the rotational axis of the rotating drum 301 by a transmission system 303.

The transmission system 303 comprises a drive pulley 303a, a driven pulley 303b and an endless belt 303c. The drive pulley 303a is attached to the rotational shaft of the motor 302 and the driven pulley 303b to the rotational shaft of the rotating drum 301, respectively. The endless belt 303c is wound around the drive pulley 303a and driven pulley 303b. The rotational motion of the motor 302 is transmitted to the rotating drum 301 via this belt-pulley mechanism. That is, it is possible to rotate the rotating drum 301 by driving the motor 302. The motor 302 is a stepping motor, and its rotational rate can be controlled by the control section 400. Therefore, in the high speed uniformity measurement apparatus 1 of the embodiment, the rotating drum 301 can be rotated at the desired rotational rate.

The rotating drum loading mechanism 304 is formed in the base section 100. The cylindrical surface 301a of the rotating drum 301 can move the rotating drum 301, the motor 302 and the transmission system 303 in the horizontal direction (the left-right direction in the Figure) such that they approach toward or away from the tread surface of the tire W. Further, by the rotating drum pressing mechanism 304, the cylindrical surface 301a of the rotating drum 301 can press tread surface of the tire W at a predetermined pressing force. The rotating drum pressing mechanism 304 moves the motor 302 and the transmission system 303 in the horizontal direction by a rack-pinion mechanism. The control section 400 can control the positions of the rotating drum 301, the motor 302 and the transmission system 303, and the magnitude of the pressing force which presses the cylindrical surface 301a of the rotating drum 301 against the tread surface of the tire W, by controlling this rack-pinion mechanism. A load cell 304a is mounted on the rack-pinion mechanism of the rotating drum pressing mechanism, and thereby the measurement of the magnitude of the pressing force by which the cylindrical surface 301a of the rotating drum 301 presses the tread surface of the tire W can be performed.

One side surface 202a of the spindle housing 202 is opposite the rigid wall 102 of the base section 100. This side surface 202a of the spindle housing 202 is a flat surface which is parallel to the rotational axis of the spindle 201, and is perpendicular to the direction in which the rotating drum 301 presses against the tire. In addition, this side surface 202a and the rigid wall 102 are substantially parallel. The upper side load cell 501 and the lower side load cell 502 are positioned in the gap G between the side surface 202a and the rigid wall 102. The load cells 501 and 502 are both members on a flat plate; both surfaces of the load cells are positioned so that they contact one side surface 202a of the spindle housing 202 and the rigid wall 102. The load cells 501 and 502 are arranged in the axial direction of the spindle 201. The rigid wall 102 of the base section 100 is configured so that it is almost neither displaced nor deformed at all. Therefore, the rigid wall 102 provides an opposing force to the spindle housing 202, the opposing force balancing with the force by which the rotating drum 301 presses against the tire W. In addition, the load cells 501 and 502, which are gripped between the rigid wall 102 and the spindle housing 202, are able to detect the force occurred by displacement of the spindle housing 202. The load cells 501 and 502 are able to detect pressing forces applied to them in triaxial directions. That is, the load cells 501 and 502 are able to detect the pressing forces applied to them as 3-dimensional vector quantities.

With the tire W set on the spindle 201, the cylindrical surface 301a of the rotating drum 301 is pressed against the tread surface of the tire W with a predetermined pressing force, and the rotating drum 301 and the tire W are rotated together by driving the motor 302. At this time, the pressing force by which the rotating drum 301 presses the tire W and the exciting force arising from the nonuniformity of the tire W are applied to the load cells 501 and 502. The outputs of the load cells 501 and 502 are sent to the control section 400. The control section 400 processes the load cell output results and computes the value of the tire uniformity index and the position of the tire to be cut and the amount of cutting needed to decrease the tire nonuniformity. Further, the control section 400 controls the marking means 600 so as to mark the tire to indicate the tire cut position and cutting amount computed above. A tire on which such a mark has been made is buff-processed by an appropriate tire cutting apparatus to decrease the tire nonuniformity. Instead of using the marking means 600, a cutting means such as a cutting tool could be used in a configuration that makes it possible for the measurement apparatus 1 to perform the buff alteration needed to decrease the nonuniformity.

Figure 2:
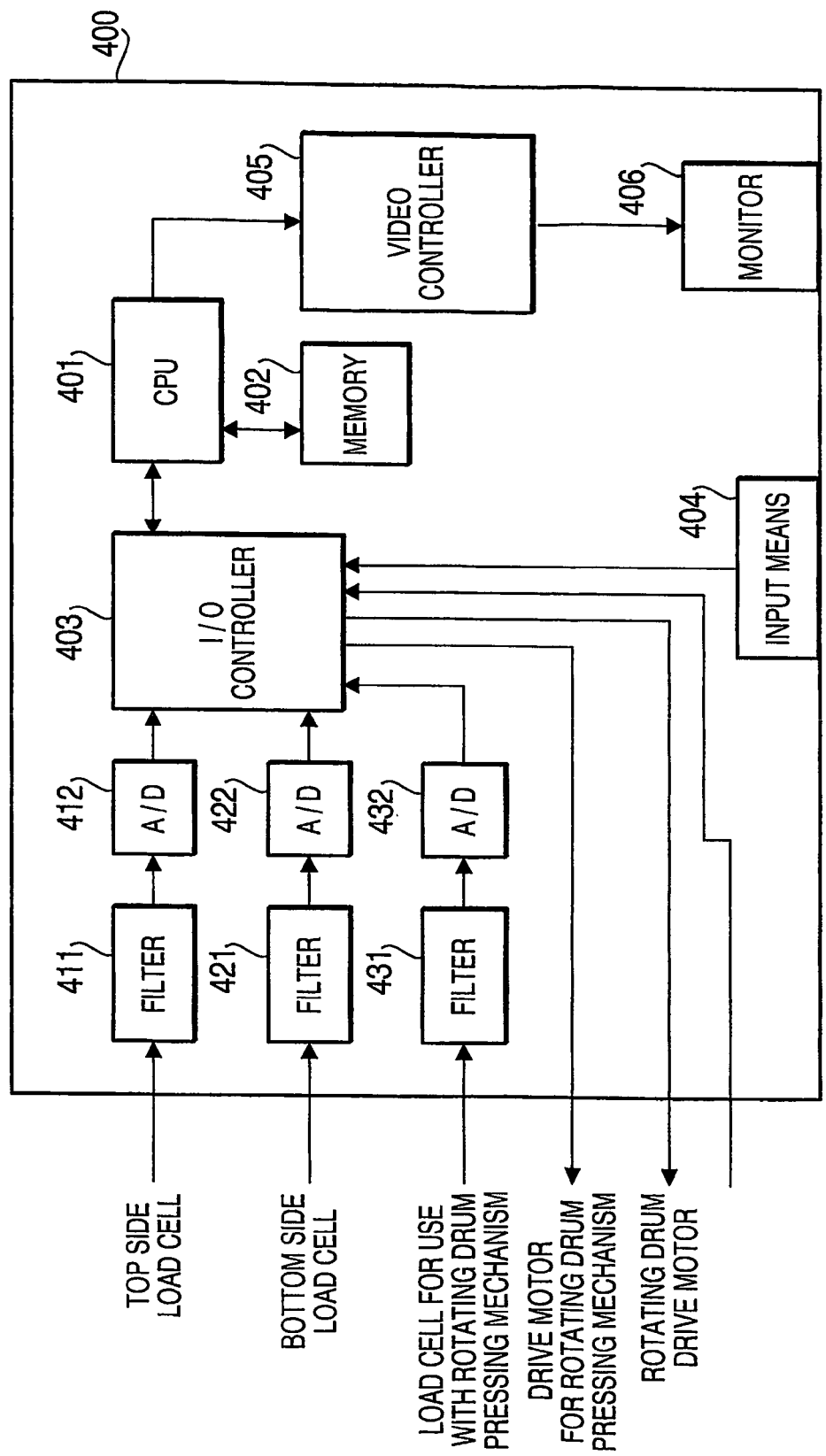
FIG. 2 is a detailed block diagram of the control section 400 in FIG. 1.

The following explanation applies to the configuration of the control section 400. FIG. 2 shows a detailed block diagram of the control section 400 in FIG. 1. The control section 400 comprises a CPU 401, a memory 402, an I/O controller 403, a input means 404, a video controller 405, a monitor 406, first through third filters 411, 421 and 431, and first through third A/D converters 412, 422 and 432.

The input means 404 is, for example, a keyboard. The operator of the measurement apparatus 1 operates this input means 404 to direct the measurement apparatus 1 to perform various measurements and calibration. The input means 404 is connected to the I/O controller 403; the CPU 401 controls the I/O controller 403 to read out the input contents input by the input means 404.

The CPU 401 controls the I/O controller 403 to perform various measurements and calibration corresponding to the contents of the instructions included in the contents of input by the input means 404. A motor 302 (FIG. 1) which drives the rotating drum 301, a rotary encoder 205 and a motor which drives the rack-pinion mechanism of the rotating drum pressing mechanism 304 are connected to the I/O controller 403. The CPU 401 can rotate the rotating drum 301 so that the tire W rotates at a desirable rotation speed, and can move the rotating drum 301 toward or away from the tire W, by controlling the I/O controller 403.

The output from the upper side load cell 501 is sent to the first filter 411 (FIG. 2). The first filter 411 removes noise from the input signal. The signal from which noise has been removed is sent to the first A/D converter 412. The first A/D converter discretizes the input signal and sends it to the I/O controller 403.

Similarly, the output from the lower side load cell 502 (FIG. 1) is passed through the second filter 421 (FIG. 2) where noise is removed from it; next, it is discretized in the second A/D converter 422 and then sent to the I/O controller 403. The output from the load cell 304a (FIG. 1) attached to the rack-pinion mechanism of the rotating drum pressing mechanism 304 (FIG. 1) is passed through the third filter 431 (FIG. 2) where noise is removed from it, then it is discretized in the third A/D converter 432, and finally sent to the I/O controller 403.

The CPU 401 controls the I/O controller 403. The discretized signals sent from the first, second and third A/D converters can be read out and stored in the memory 402 as digital data. Further, the CPU 401 processes the digital data stored in the memory 402 and computes various measured values. The CPU 401 controls the video controller 405 and can display image information related to the computed measured values (for example a graph showing fluctuations of the tire exciting force as a function of tire phase) on the monitor 406.

We now describe the method for measuring tire uniformity and dynamic balance using the measurement apparatus 1 of this embodiment as described above.

First, calibration is performed. The "calibration" referred to here is the determination of the coefficient for computing the forces actually received by the load cells from the load cell output signals; and determination of the coefficient for computing the force acting on the plane including the upper sidewall of the tire in FIG. 1 (referred to below as the upper surface) and the force acting on the plane including the lower sidewall of the tire in FIG. 1 (referred to below as the lower surface), respectively, from the forces received by the load cells. It is sufficient for the calibration of the coefficients used to compute the forces actually received by the load cells from the load cell output signals to be performed periodically (for example once per week), therefore it is not necessary to perform these calibrations every time a tire is measured. Additionally, it is sufficient to perform the calibration to determine the coefficient used to compute the forces occurring at the upper and lower tire surfaces, respectively, from the forces received by the load cells once for each type of tire.

First, calibration to determine the coefficient used to obtain the force received by the load cell 304a from the output level of the load cell 304a of the rotating drum pressing mechanism 304 is performed. In this calibration, a known load is applied in the direction of the load applied by the rotating drum pressing mechanism 304, that is to say the direction in which the rotating drum pressing mechanism 304 moves the rotating drum 301 (the left-right direction in FIG. 1), and the coefficient that will give the force received by the load cell 304a from the output level of the load cell 304a of the rotating drum pressing mechanism 304 is determined from the output at that time. In this embodiment, the output $O_1$ of the load cell 304a and the force $F_1$ applied to the load cell 304a satisfy the equation $F_1 = a_1 \times O_1 + b_1$. The coefficients $a_1$ and $b_1$ are computed from $O_1$ in the unloaded condition and $O_1$ when a load of known magnitude is applied to the rotating drum. The computed $a_1$ and $b_1$ are stored in the memory 402.

Similarly, calibrations are performed to determine the coefficients used to obtain the forces received by load cells from the outputs of load cells, for the upper side load cell 501 and the lower side load cell 502. In this case, a force of known magnitude is applied to the spindle housing 202, and the outputs of the load cells 501 and 502 at that time are used to determine the coefficient used to obtain the forces received by the load cells from the load cell output levels. Each of the upper side load cell 501 and the lower side load cell 502 measures force components in 3 mutually orthogonal directions (to be referred to below as the x, y and z directions, respectively), therefore the calibrations are performed for each component. In addition, as shown in FIG. 1, since the spindle housing 502 is a kind of cantilever beam wherein the positions at which the load cells 501 and 502 are mounted are defined as support points, the load on the spindle housing 202 is dividedly distributed to the load cells 501 and 502.

Therefore, when a force Fx is applied to the spindle housing 202 in the x component direction, the relation given by the Equations (1) holds among the magnitude $Fx_1$ of the force in the x component direction received by the load cell 501, the x component output $Ox_1$ of the load cell 501, the magnitude $Fx_2$ of the force in the x component direction received by the load cell 502 and the x component $Ox_2$ of the output of the load cell 502.

$$Fx = Fx_1 + Fx_2$$

$$Fx_1 = ax_1 \times Ox_1 + bx_q \quad (1)$$

$$Fx_2 = ax_2 Ox_2 + bx_2$$

The coefficients $ax_1$, $bx_1$, $ax_2$ and $bx_2$ are computed from $Ox_1$ and $Ox_2$ in the unloaded condition and $Ox_1$ and $Ox_2$ when (at least 2 different) loads of known magnitudes are applied to the spindle housing 202. In this procedure, the coefficients required to obtain the x components of the forces received by the load cells from the load cell output levels are computed for the upper side load cell 501 and the lower side load cell 502. The coefficients required to obtain the y and z components of the forces received by the load cells from the load cell output levels are computed from the upper side load cell 501 and the lower side load cell 502. The coefficients required to obtain the y and z components of the forces received by the load cells from the load cell output levels are computed by a similar procedure.

Next, calibration to determine the coefficients used to compute the forces acting on the top surface and bottom surface of the tire, respectively, from the forces received by the load cells is carried out. In this calibration, a tire which can be regarded as having neither nonuniformity nor unbalance (referred to below as the master tire), and a known weight, are used.

The weight of mass M is attached to the top surface of the master tire at a specified distance s from the rotational axis of the tire. At this time, the top surface of the master tire is unbalanced by the weight, while the bottom surface remains without unbalance.

Next, the master tire is attached to the spindle 201. Next, the rotating drum pressing mechanism 304 is rotatably driven so that the rotating drum 301 presses on the master tire with a force of 50 to 80 [kgf]. In other words, the rotating drum pressing mechanism 304 is driven so that the output of the load cell 304a indicates 50 to 80 [kgf].

Next, the rotating drum 301 is rotatably driven by the motor 302. At this time, the master tire rotates together with the rotating drum. When it is detected from the output of the rotary encoder 205 that the rotational rate of the master tire has reached a specified rotational rate N, the CPU 401 (FIG. 2) controls the I/O interface 403 to acquire the outputs of the load cells 501 and 502.

From the outputs of the load cells, the CPU 401 (FIG. 1) obtains the components of the forces received by the load cells 501 and 502 in the tractive direction (the tangent direction of the rotating drum at the position where the master tire is in contact with the rotating drum, that is to say the direction from the foreground toward the background, into the paper, in FIG. 1). The values that are obtained are $TF_1(\theta)$ and $TF_2(\theta)$. $TF_1$ is the value obtained from the output of the upper side load cell 501, and $TF_2$ is the value obtained from the output of the lower side load cell 502. $\theta$ is the phase of the spindle 201.

At this time, the force produced in the tire is the resultant of a force that can be regarded as practically the equivalent of the centrifugal force produced by unbalance in the tire, and the force with which the rotating drum 301 presses the tire. Since the force with which the rotating drum 301 presses the tire is in a direction nearly perpendicular to the tractive direction of the tire, the component in the tractive direction of the centrifugal force produced at the top surface of the master tire can be regarded as nearly equivalent to the component in the tractive direction of the centrifugal force produced by the tire unbalance. Therefore, the component in the tractive direction of the force produced at the top surface of the master tire is approximately a sine wave with the absolute value of the signed maxima and minima being $M \times s \times (2\pi \times N)^2$, and its phase depends on the position at which the weight is attached. This function is called $Fm_1(\theta)$. Among the components in the front-rear direction of forces acting on the top surface of the master tire, the proportion of force $\alpha_1$ received by the top surface load cell 501 and the proportion $(1-\alpha_1)$ received by the bottom surface load cell 502 can be regarded as fixed, independent of the force acting on the top surface of the master tire. Thus, $\alpha_1$ can be computed by comparing $Fm_1(\theta)$, $TF_1(\theta)$ and $TF_2(\theta)$. Concretely, $\alpha_1 = Fm_1(\theta)/TF_1(\theta)$.

Next, the rotation of the rotating drum 301 is stopped. Next, the weight is removed from the top surface of the master tire.

Next, the weight of mass M is attached to the bottom surface of the master tire at a specified position a distance s from the rotational axis of the tire. At this time, the weight produces unbalance of the bottom surface of the master tire, while the top surface remains without unbalance.

Next, the rotating drum pressing mechanism 304 is driven to press the rotating drum against the master tire with a force of 50 to 80 [kgf]. In other words, the rotating drum pressing mechanism 304 is driven so that the output of the load cell 304a indicates 50 to 80 [kgf].

Next, the rotating drum 301 is rotatably driven by the motor 302. At this time, the master tire rotates together with the rotating drum. When it is detected from the output of the rotary encoder 205 that the rotational rate of the master tire has reached a specified rotational rate N, the CPU 401 (FIG. 2) controls the I/O interface 403 to acquire the outputs of the load cells 501 and 502.

From the outputs of the load cells, the CPU 401 (FIG. 1) obtains the components of the forces received by the load cells 501 and 502 in the tractive direction. The values that are obtained are $BF_1(\theta)$ and $BF_2(\theta)$. $BF_1$ is the value obtained from the output of the upper side load cell 501, and $BF_2$ is the value obtained from the output of the lower side load cell 502. $\theta$ is the phase of the spindle 201.

At this time, the force produced in the tire is the resultant of a force that can be regarded as practically the equivalent of the centrifugal force produced by unbalance in the tire, and the force with which the rotating drum 301 presses the tire. Since the force with which the rotating drum 301 presses the tire is in a direction nearly perpendicular to the tractive direction of the tire, the component in the tractive direction of the centrifugal force produced at the bottom surface of the master tire can be regarded as nearly equivalent to the component in the tractive direction of the centrifugal force produced by the tire unbalance. Therefore, the component in the tractive direction of the force produced at the top surface of the master tire is approximately a sine wave with the absolute value of the signed maxima and minima being $M \times s \times (2\pi \times N)^2$, and its phase depends on the position at which the weight is attached. This function is called $Fm_2(\theta)$. Among the components in the front-rear direction of forces acting on the top surface of the master tire, the proportion of force $\alpha_2$ received by the top surface load cell 501 and the proportion $(1-\alpha_2)$ received by the bottom surface load cell 502 can be regarded as fixed, independent of the force acting on the top surface of the master tire. Consequently, $\alpha_2$ can be computed by comparing $Fm_2(\theta)$ and $BF_1(\theta)$, $BF_2(\theta)$. Accordingly, $\alpha_2 = Fm_2(\theta)/BF_1(\theta)$.

The exciting force produced at the top surface of the tire and the exciting force produced at the bottom surface of the tire can be computed from the outputs of the load cells 501 and 502 by using $\alpha_1$ and $\alpha_2$ determined above. That is, suppose that, in a given tire, TTW is the component in the tractive direction of the exciting force which occurs at the top surface and TBW is the tractive component of the exciting force which occurs at the bottom surface. In addition, $MF_1$ is defined as the component in the tractive directive direction of the force detected by the top side load cell 501, and $MF_2$ is defined as the component in the tractive direction of the force detected by the bottom side load cell 502. At this time, relations such as those given in Equations 2 among TTW, TBW, $MF_1$ and $MF_2$ are satisfied.

$$MF_1 = TTW \times \alpha_1 + TBW \times \alpha_2$$

$$MF_1 = TTW \times (1-\alpha_1) + TBW \times (1-\alpha_2) \quad (2)$$

It can be seen from Equations 2 that TTW and TBW can be computed from Equations 3.

$$TTW = ((1-\alpha_2) \times MF_1 - \alpha_2 \times MF_2)/(\alpha_1 - \alpha_2)$$

$$TBW = ((1-\alpha_1) \times MF_1 - \alpha_1 \times MF_2)/(\alpha_2 - \alpha_1) \quad (3)$$

Using α1 and α2 obtained above, the components in the tractive direction of the exciting forces which occur at the top surface and bottom surface, respectively, of the tire can be found from the components in the tractive direction of the forces received by the load cells 501 and 502.

Next, calibration is performed to determine the coefficients needed to find the component in the radial direction (the direction from the position where the master tire and the rotating drum are in contact, that is, the left-right direction in FIG. 1) of the resultant of the force received at the top surface of the tire and the exciting force that occurs at the top surface of the tire, and the component in the radial direction of the resultant of the force received at the bottom surface of the tire and the exciting force that occurs at the bottom surface of the tire, from the components in the radial direction of the forces received by the load cells 501 and 502.

The weight of mass M is attached to the top surface of the tire at a specified distance s from the rotational axis of the tire. At this time, unbalance due to the weight occurs at the top surface of the tire, while at the same time the bottom surface remains free of unbalance.

Next, the rotating drum pressing mechanism 304 is driven so that the rotating drum 301 presses the master tire with a force of about 50 to 80 [kgf]. In other words, the rotating drum pressing mechanism 304 is driven so that the load cell 304a output indicates 50 to 80 [kgf]. The magnitude of the force with which the rotating drum 301 presses the master tire is fixed through this calibration. This magnitude is called FD.

Next, the rotating drum 301 is rotatably driven by the motor 302. At this time, the master tire rotates together with the rotating drum. When it is detected from the output of the rotary encoder 205 that the master tire rotational rate reaches the specified rotational rate N, the CPU 401 (FIG. 2) controls the I/O interface 403 to acquire the outputs of the load cells 501 and 502.

The CPU 401 (FIG. 1) obtains the components in the radial direction of the forces received by the load cells 501 and 502 during one complete rotation of the master tire. These values are called $TF_3(\theta)$ and $TF_4(\theta)$. $TF_3(\theta)$ is the value obtained from the output of the top side load cell 501, and $TF_4(\theta)$ is the value obtained from the output of the bottom side load cell 502. $\theta$ is the phase of the spindle 201.

At this time, the force produced in the tire is the resultant of a force that can be regarded as practically the equivalent of the centrifugal force produced by unbalance in the tire, and the force with which the rotating drum 301 presses the tire. Therefore, the force in the radial direction that acts on the top surface of the master tire is approximated by a sine wave that has a maximum value of $M \times s \times (2\pi \times N)^2 + FD/2$ and a minimum value of $M \times s \times (2\pi \times N)^2 - FD/2$. The phase is determined by the position at which the weight is attached. This function is called $Fm_3(\theta)$. Among the components in the front-rear direction of forces acting on the top surface of the master tire, the proportion of force $\beta_1$ received by the top surface load cell 501 and the proportion $(1-\beta_1)$ received by the bottom surface load cell 502 can be regarded as fixed, independent of the force acting on the top surface of the master tire. Consequently, $\beta 1$ can be computed by comparing $Fm_3(\theta)$, $TF_1(\theta)$ and $TF_2(\theta)$. Concretely, $\beta_1 = Fm_3(\theta)/TF_3(\theta)$.

Next, the rotation of the rotating drum 301 is stopped. Next, the weight is removed from the top surface of the master tire.

Next, the weight of mass M is attached to the bottom surface of the master tire at a specified position a distance s from the rotational axis of the tire. At this time, an unbalance due to the weight occurs in the bottom surface of the master tire, while the top surface remains free of unbalance.

Next, the rotating drum pressing mechanism 304 is driven so that the rotating drum 301 presses the master tire with force FD.

Next, the rotating drum 301 is rotatably driven by the motor 302. At this time, the master tire rotates together with the rotating drum. When it is detected from the output of the rotary encoder 205 that the master time rotational rate has reached the specified rotational rate of N, the CPU 401 (FIG. 2) controls the I/O interface 403 to acquire the outputs of the load cells 501 and 502.

The CPU 401 (FIG. 1) obtains the components in the radial direction of the forces received by the load cells 501 and 502 during one complete rotation of the master tire. These values are called $BF_3(\theta)$ and $BF_4(\theta)$. $BF_3(\theta)$ is the value obtained from the output of the top side load cell 501, and $BF_4(\theta)$ is the value obtained from the output of the bottom side load cell 502. $\theta$ is the phase of the spindle 201.

At this time, the force produced in the tire is the resultant of a force that can be regarded as practically the equivalent of the centrifugal force produced by unbalance in the tire, and the force with which the rotating drum 301 presses the tire. Consequently, the force in the radial direction that acts on the top surface of the master tire is approximated by a sine wave that has a maximum value of $M \times s \times (2\pi \times N)^2 + FD/2$ and a minimum value of $M \times s \times (2\pi \times N)^2 - FD/2$. The phase is determined by the position at which the weight is attached. This function is called $Fm_4(\theta)$. Among the components in the front-rear direction of forces acting on the top surface of the master tire, the proportion of force $\beta_2$ received by the top surface load cell 501 and the proportion $(1-\beta_2)$ received by the bottom surface load cell 502 can be regarded as fixed, independent of the force acting on the top surface of the master tire. Accordingly, $\beta_1$ can be computed by comparing $Fm_4(\theta)$, $BF_3(\theta)$ and $BF_4(\theta)$. Concretely, $\beta_2 = Fm_4(\theta)/BF_3(\theta)$.

The resultant of the force applied to the top surface of the tire and the exciting force produced at the top surface of the tire and the resultant of the force applied to the bottom surface of the tire and the exciting force produced at the bottom surface of the tire, can be computed from the outputs of the load cells 501 and 502 by using $\beta_1$ and $\beta_2$ determined above. That is to say, suppose that, in a given tire, RTW is the component in the radial direction of the resultant of the force applied to the top surface of the tire and the exciting force which occurs at the top surface, and RBW is the component in the radial direction of the resultant of the force applied to the bottom surface of the tire and the exciting force which occurs at the bottom surface. In addition, let $MF_3$ be the component in the radial direction of the force detected by the top side load cell 501, and let $MF_4$ be the component in the radial direction of the force detected by the bottom side load cell 502. At this time, the relations given in Equations 4 among RTW, RBW, $MF_3$ and $MF_4$ are satisfied.

$$MF_3 = RTW \times \beta_1 + RBW \times \beta_2$$

$$MF_4 = RTW \times (1-\beta_1) + RBW \times (1-\beta_2) \quad (4)$$

From Equations 4, it is seen that RTW and RBW can be computed from Equations 5.

$$RTW = ((1-\beta_2) \times MF_3 - \beta_2 \times MF_4)/(\beta_1 - \beta_2)$$

$$RBW = ((1-\beta_1) \times MF_3 " \beta_1 \times MF_4)/(\beta_2 - \beta_1) \quad (5)$$

The dynamic balance and uniformity of the tire are measured using the coefficients computed in the above calibration.

Figure 3:
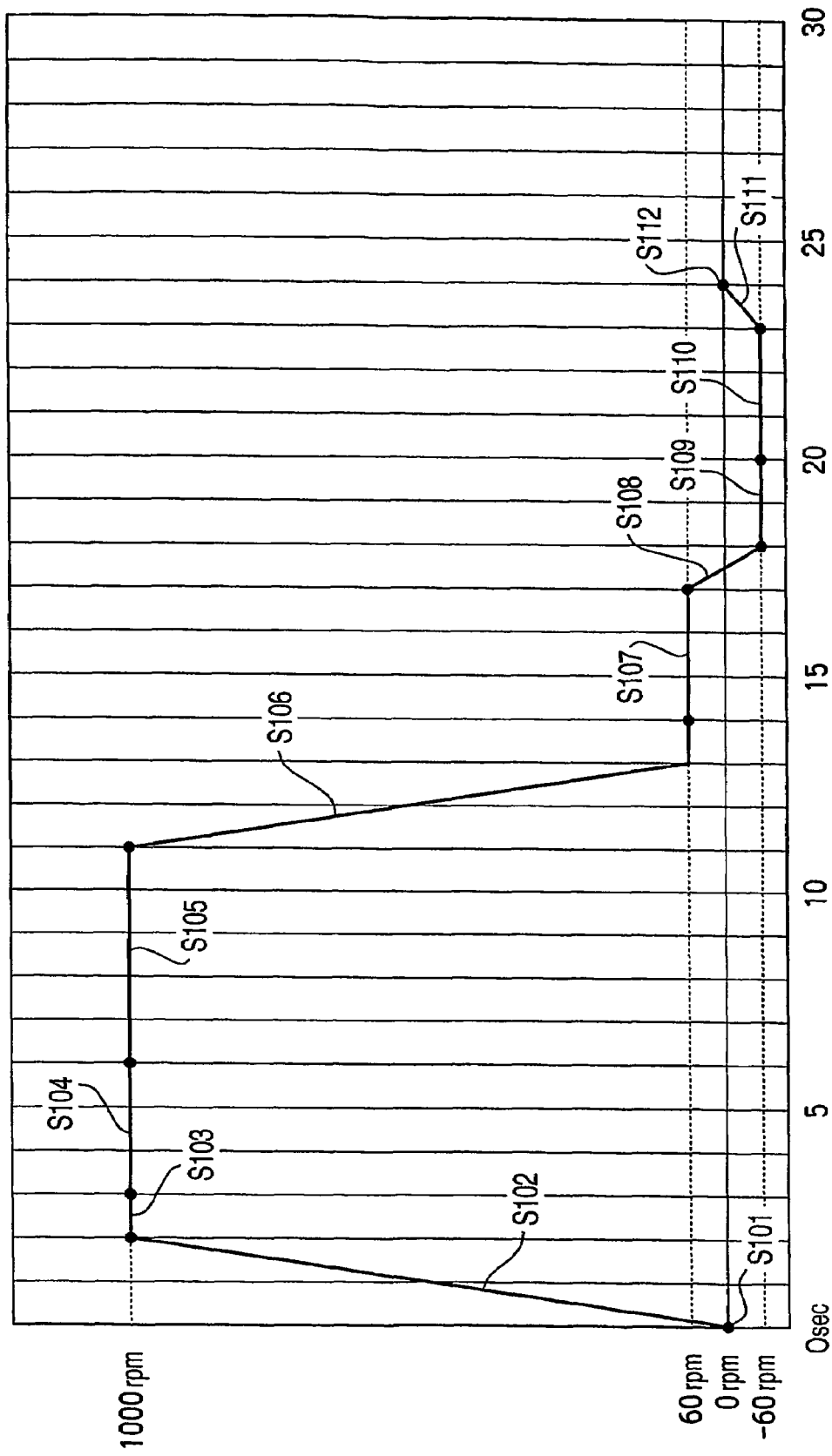
FIG. 3 is a time chart showing the tire dynamic balance and uniformity measurement method using the measurement apparatus 1, according to the embodiment shown in FIG. 1.

FIG. 3 is a time chart showing the measurement procedure of dynamic balance and uniformity of a tire using the measurement apparatus 1. In this measurement procedure, for one tire the dynamic balance measurement, the high speed uniformity measurement and the uniformity measurement according to the JASO C 607 standard are performed in rapid succession. FIG. 3 is a time chart with elapsed time as the abscissa and tire rotational rate as the ordinate. The series of tests listed below are carried out by the CPU 401, which executes programs stored in the memory 402 (FIG. 2) of the measurement apparatus 1.

First, the tire is attached to the spindle 201, and the tire is fixed to the spindle 201 by the top adapter 203.

Next, the rotating drum 301 is pushed into contact with the tire. Next, the rotating drum 301 is pressed against the tire W with a force of 150 [kgf] (FIG. 3: S101 (0 [sec])). This pressing force is determined by dividing the weight of a vehicle on which the tire W is mounted by the number of the tires. Generally, the pressing force is between 200 [kgf] and 1000 [kgf]. Next, in this condition the rotating drum 301 is rotatably driven (consequently the tire that is in contact with the rotating drum 301 rotates together with the rotating drum 301); the rotating drum 301 is accelerated until the tire rotational rate reaches 1000 [rpm] (FIG. 3: S102 (0 to 2 [sec])). Next, the pressing force which presses the tire against the rotating drum 301 is set to 50 [kgf] (FIG. 3: S103 (2 to 3 [sec])). This pressing force produces a friction force between the rotating drum 301 and the tire W. The magnitude of the pressing force is determined such that the friction force is so large as enough to prevent free rotation of the rotating drum 301 and is smaller than the measurement error of the forces measured by the load cells 501 and 502. In general, the pressing force is between 50 [kgf] and 80 [kgf].

In this embodiment of the invention, the time required from start of the rotation of the rotating drum 301 until the rotational rate reaches 1000 [rpm] is 2 seconds. In addition, after the tire rotational rate reaches 1000 [rpm], the time required until the pressing force of the rotating drum 301 against the tire reaches 50 [kgf] is 1 second. Accordingly, until the start of measurement of the tire exciting force, the tire rotates 30 times or more while receiving a force of 50 to 150 [kgf] in the horizontal direction. As a result, the tire is pushed downward, and the tire rotational axis nearly coincides with the spindle rotational axis.

Next, the fluctuations of the load on the load cells 501 and 502 are detected while the spindle 201 is rotating (FIG. 3: S104 (3 to 6 [sec])). This detection is for the purpose of measuring the dynamic balance of the tire. The load cells 501 and 502 are capable of measuring in 3 mutually orthogonal directions, but what is necessary to measure the dynamical balance is the component in an arbitrary horizontal direction.

In this embodiment of the invention, the component of the load fluctuation in the tractive direction is detected in order to remove the effect of the load applied to the tire from the rotating drum 301. Values nearly equivalent to the centrifugal forces produced by the dynamical unbalance of the top surface and the bottom surface of the tire, respectively, can be determined by substituting the detected load fluctuation components into Equations 3. These dynamic unbalances are expressed as functions of the tire phase θ. We let $FT_1(\theta)$ be the centrifugal force acting on the top surface of the tire and $FT_2(\theta)$ be the centrifugal force acting on the bottom surface of the tire. $FT_1(\theta)$ and $FT_2(\theta)$ are in units of [kgf].

The phase at which unbalance of the tire occurs and the magnitude of the unbalance are computed for the top surface and the bottom surface of the tire, respectively, from $FT_1(\theta)$ and $FT_2(\theta)$. That is to say, the phase at which unbalance occurs at the top surface of the tire is the phase at which $FT_1(\theta)$ becomes a maximum (this phase will be called $\theta_{max1}$ below); the phase at which unbalance occurs at the bottom surface of the tire is the phase at which $FT_2(\theta)$ is maximum (this phase is called $\theta_{max2}$ below). Further, the magnitude $UB_1$ of the unbalance at the top surface of the tire and the magnitude $UB_2$ at the bottom surface of the tire are computed from Equations 6.

$$UB_1 = FT_1(\theta_{max1}) \times \frac{9.8}{(6000 \times 2\pi)^2} \quad (6)$$

$$UB_2 = FT_2(\theta_{max2}) \times \frac{9.8}{(6000 \times 2\pi)^2}$$

$UB_1$ and $UB_2$ are in units of [kg m]. Therefore, to remove the unbalance at the top surface side, it is sufficient to remove the weight $UB_1/s_1$ from the top surface of the tire at a position where the phase is $\theta_{max1}$, a distance $s_1$ [m] from the rotational axis of the tire. Similarly, to remove the unbalance from the bottom surface of the tire, it is sufficient to remove the weight of material $UB_2/s_2$ from the bottom surface of the tire, at a position where the phase is $\theta_{max2}$, a distance s2 from the rotational axis of the tire. Since these unbalances are one of the causes of nonuniformity of the tire, removing these unbalances will decrease the nonuniformity of the tire.

Next, a high speed uniformity test is performed with the rotating drum 301 pressing the tire with a pressing force of 500 [kgf] (FIG. 3: S105 [6 to 11] sec)). In this embodiment, the tire rotational rate is 1000 [rpm] in the high speed uniformity test; this is intended to simulate a vehicle with tires of diameter 600 to 700 mm running at 100 to 130 [km/h]. Consequently, if a test is to be performed on a tire of larger or smaller diameter, the tire should be rotated at a different rotational rate corresponding to a tire circumferential speed of 100 to 140 [km/h]. The load fluctuations which the tire receives are detected by the load cells 501 and 502. The RFV and TFV of the top surface of the tire, the RFV and TFV of the bottom surface of the tire, and the LFV of the entire tire are measured from these load fluctuations.

That is to say, the 3-dimensional vector loads received by the load cells 501 and 502 are decomposed into components in the radial direction, the lateral direction (the direction of the tire rotational axis) and the tractive direction by the CPU 401. These are expressed as functions of the tire phase θ. The forces received by the top side lead cell 501 (FIG. 1) in the radial direction, the horizontal direction and the tractive direction, respectively, are taken to be TRF(θ), TLF(θ) and TTF(θ), respectively. In addition, the forces received by the bottom side load cell 502 in the radial direction, the lateral direction and the tractive direction are denoted as BRF(θ), BLF(θ) and BTF(θ), respectively.

Next, RFV and TFV for the top surface of the tire, RFV and TFV for the bottom surface of the tire, and LFV for the whole tire are computed from TRF(θ), TLF(θ), TTF(θ), BRF(θ), BLF(θ) and BTF(θ) using Equations 7.

RFV at the top surface:

amplitude of fluctuation of $\dfrac{(1-\beta_2)\times TRF(\theta)-\beta_2 BRF(\theta)}{\beta_1-\beta_2}$ TFV at the top surface:

amplitude of fluctuation of $\dfrac{(1-\alpha_2)\times TTF(\theta)-\alpha_2 BTF(\theta)}{\alpha_1-\alpha_2}$ RFV at the bottom surface: (7)

amplitude of fluctuation of $\dfrac{(1-\beta_2)\times TRF(\theta)-\beta_2 BRF(\theta)}{\beta_1-\beta_2}$ TFV at the bottom surface:

amplitude of fluctuation of $\dfrac{(1-\alpha_2)\times TTF(\theta)-\alpha_2 BTF(\theta)}{\alpha_1-\alpha_2}$ LFV of whole tire: amplitude of fluctuation of $TLF(\theta)+BLF(\theta)$ Next, a uniformity test is performed according to the JASO C607 standard. That is to say, the rotating drum 301 is decelerated and the tire is rotated at 60 [rpm] (FIG. 3: S106 (11 to 14 [sec])). Then the fluctuation of the load received by the tire C is detected by the load cells 501 and 502 (FIG. 3: S107 (14 to 17 [sec])). That is to say, the forces received by the top side load cell 501 (FIG. 1) in the radial direction, the lateral direction and the tractive direction are denoted as TRF(θ), TLF(θ) and TTF(θ), respectively. Denoting the forces received by the bottom side load cell 502 in the radial direction, the lateral direction and the tractive direction as BRF(θ), BLF(θ) and BTF(θ), respectively, RFV, LFV and TFV of the tire can be computed using Equations 8.

RFV: amplitude of fluctuation of TRF(θ)+BRF(θ)   [Equation 8]

LFV: amplitude of fluctuation of TLF(θ)+BLF(θ)

TFV: amplitude of fluctuation of TTF(θ)+BTF(θ)

Next, rotation of the tire and the rotating drum 301 is temporarily stopped, the rotation direction of the tire and the rotating drum 301 is inverted and the tire is rotated at 60 [rpm] (FIG. 3: S108 (17 to 18 [sec])). Next, warm-up operation is performed (FIG. 7: S109 (18 to 20 [sec])). Next, the fluctuation of the load received by the tire is detected by the load cells 501 and 502 (FIG. 3: S110 (20 to 23 [sec])), and the uniformity is calculated based on the detected load fluctuations using Equations 8. Next, the tire and the rotating drum 301 are decelerated (FIG. 3: S111 (23 to 24 [sec])), and rotation is stopped (FIG. 3: S112 (24 [sec])).

After measurement of the tire by the procedure described above is completed, the tire is removed from the measurement apparatus 1 and buff—altered by the cutting apparatus to remove the unbalance components from the top surface and bottom surface of the tire.

As described above, based on this embodiment, by measuring the uniformity of the tire it is possible to distinguish a tire that has large nonuniformity of the top surface and/or the bottom surface. In addition, according to this embodiment, it is possible to remove dynamic unbalance that occurs at the top surface and/or bottom surface of the tire. Accordingly, among tire nonuniformities, it is possible to remove elements caused by dynamic unbalance, that is to say it is possible to decrease the tire nonuniformity. The present embodiment is configured so that the resultant of the force received by the tire at its top surface and the exciting force that occurs at the top surface of the tire, and the resultant of the force received by the tire at its bottom surface and the exciting force that occurs at the bottom surface of the tire, are determined from the forces received by 2 load cells, but based on a similar principle, it is possible to have a configuration in which the forces received by the tire at each of its surfaces and the exciting forces which occur at each surface of the tire are calculated from the outputs of a larger number of load cells.

In the embodiment described above, the configuration is such that the uniformity test according to the JASO C607 standard, the high speed uniformity test and the dynamic balance test are performed in succession, but this invention is not limited to the configuration described above. For example, it is possible for a testing apparatus according to this invention to be configured so that it normally performs only the uniformity test, and only when a nonuniformity of a specified threshold value or greater is detected is a dynamic balance test performed. Such an embodiment is described below.

Second Embodiment

Figure 4:
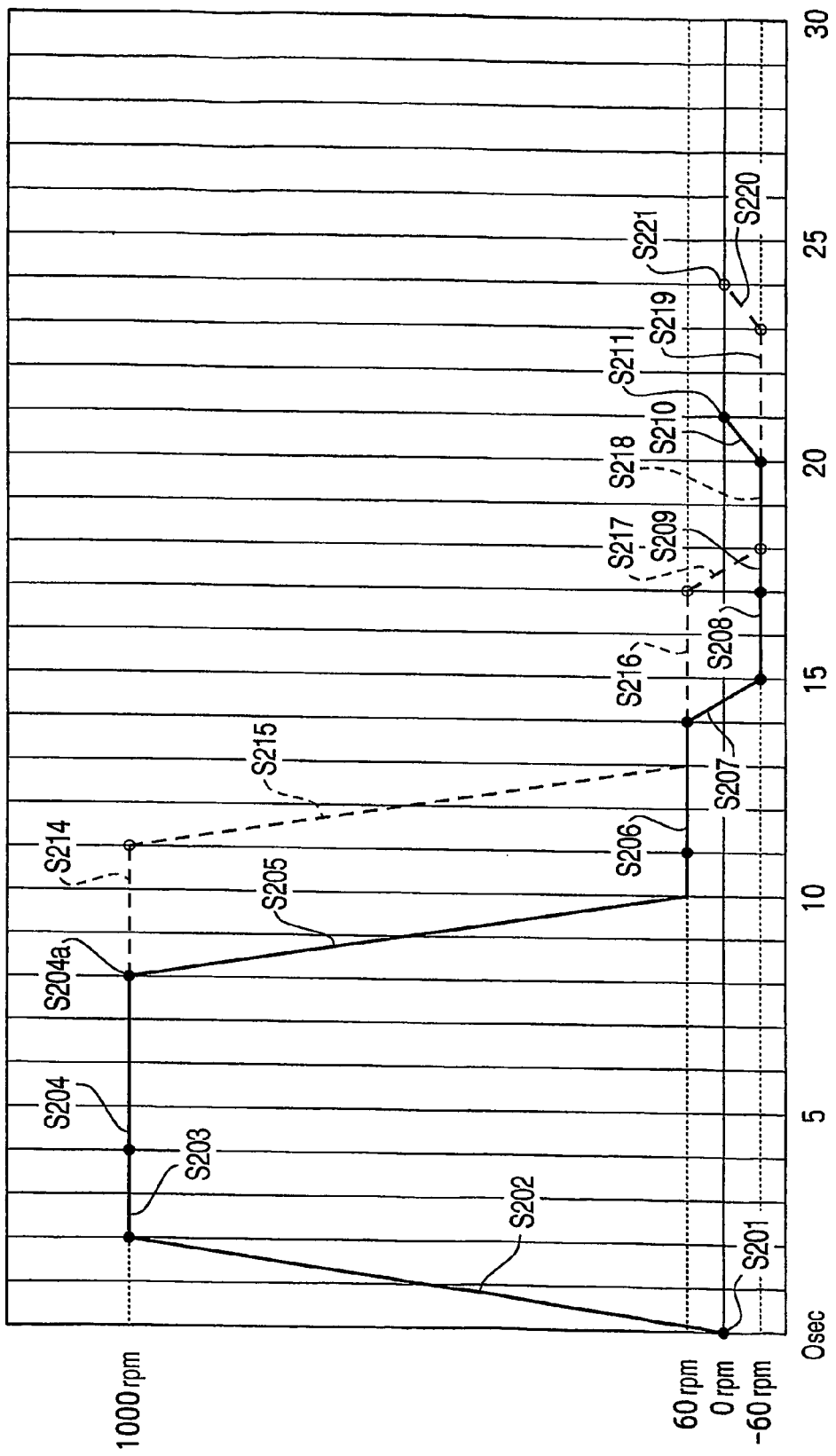
FIG. 4 is a time chart showing the tire dynamic balance and uniformity measurement method using the measurement apparatus 1, according to the modified embodiment of this invention.

FIG. 4 is a time chart showing the measurement procedure for measuring the dynamic balance and uniformity of a tire using the measurement apparatus 1 in the second embodiment. In this embodiment, a high speed uniformity test and a uniformity test according to the JASO C607 standard are performed on one tire. After the high speed uniformity measurement, depending on the result a dynamic balance test is performed. Similarly to FIG. 3, FIG. 4 is a time chart having elapsed time as the abscissa and tire rotational rate as the ordinate. The series of tests described below are carried out by execution of programs stored in the memory (FIG. 2) of the measurement apparatus 1 by the CPU 401. In addition, before the measurements, calibrations similar to those in the first embodiment are performed.

First, the tire is attached to the spindle 301, and the tire is fixed to the spindle 201 by the top adapter 203.

Next, the tire is pushed into contact with the rotating drum 301. Next, the rotating drum 301 is pressed against the tire with a force of 150 [kgf]. Next, in this condition the rotating drum 301 is rotated (consequently the tire in contact with the rotating drum 301 rotates together with the rotating drum 301). The rotating drum 301 is accelerated until the tire rotational rate reaches 1000 [rpm] (FIG. 4: S202 (0 to 2 [sec])) Next, the pressing force with which the rotating drum 301 presses against the tire is set to 500 [kgf] (FIG. 4: S203 (2 to 4 [sec])).

In this embodiment of this invention, the time required from the start of rotation of the rotating drum 301 until the tire rotational rate reaches 1000 [rpm] is 2 seconds. The additional time required, after the tire rotational rate reaches 1000 [rpm] until the pressing force by which the rotating drum 301 is pressed against the tire reaches 500 [kgf], is 2 seconds. Consequently, until measurement of the exciting force on the tire starts, the tire rotates 30 times or more while receiving a force of 50 to 500 [kgf] in the horizontal direction. As a result, the tire is pushed downward, and the rotational axis of the tire and the rotational axis of the spindle 201 nearly coincide.

Next, the fluctuation of the load on the load cells 501 and 502 is detected while the spindle 201 is rotating (FIG. 4: S204 (4 to 8 [sec])). This detection is for the purpose of measuring the high speed uniformity of the tire. In this embodiment, also, the tire rotational rate in the high speed uniformity test is set at 1000 [rpm] to simulate a vehicle with wheels of diameter 600 to 700 mm running at a speed of 110 to 130 [km/h], In a test of tires of larger or smaller diameter, the tire would be rotated at a different rotational rate so that the circumferential speed comes to 100 to 140 [rpm]. Then the fluctuation of the load received by the tire is detected by the load cells 501 and 502. The RFV and TFV of the top surface of the tire, the RFV and TFV of the bottom surface of the tire, and the LFV of the entire tire are measured from these load fluctuations. The measurement method is similar to that for the first embodiment of this invention, so an explanation of it is omitted here.

Next, judgments are made as to whether or not the RFV values at the top surface and the bottom surface of the tire exceed specified standard values (for example RFV=10 [kgf m], TFV=8 [kgf m]) (FIG. 4: S204a (8 [sec])). If the RFV at either the top surface or bottom surface of the tire exceeds the standard value, next the dynamic balance and the uniformity according to the JASO C607 standard are measured. In this case, the tire rotational rate varies according to the dotted lines in FIG. 4.

Next, the pressing force with which the rotating drum 301 presses against the tire is set to 50 [kgf], and the dynamic balance of the tire is measured (FIG. 4: S214 (8 to 11 [sec])) The method of measuring the dynamic balance is similar to that in the first embodiment, so an explanation of it is omitted here.

Next, a uniformity test according to JASO C607 is performed. That is to say, the rotating drum 301 is decelerated so as to rotate the tire at 60 [rpm] and the pressing force with which the rotating drum 301 presses against the tire is set to 500 [kgf] (FIG. 4: S215 (11 to 13 [sec])). Then the fluctuation of the load received by the tire C is detected by the load cells 501 and 502 (FIG. 43: S216 (13 to 17 [sec])). The method of measuring the uniformity from the load fluctuations is similar to that in the first embodiment, so an explanation of it is omitted here.

Next, rotation of the tire and the rotating drum 301 is temporarily stopped, the direction of rotation of the tire and the rotating drum 301 is reversed, and the tire is rotated at 60 [rpm] (FIG. 4: S217 (17 to 18 [sec])). Next, warm-up operation is performed (FIG. 4: S218 (18 to 20 [sec])). Next, the fluctuations of the load received by the tire are detected by the load cells 501 and 502 (FIG. 4: S219 (20 to 23 [sec])), and the uniformity is calculated based on the detected load fluctuations. Next, the tire and the rotating drum 301 are decelerated (FIG. 4: S220 (23 to 24 [sec]), and the rotation is stopped (FIG. 4: S221 (24 [sec])).

After measurement of the tire according to the procedure described above has been completed, the tire is removed from the measurement apparatus 1, and buff-alteration is performed by a cutting apparatus to remove unbalance from the top surface and/or the bottom surface of the tire.

Meanwhile, if the RFV values at both the top surface and the bottom surface of the tire are less than a standard value in S204a, next the uniformity measurement according to the JASO C607 standard is performed. In this case, the rotational rate of the tire varies according to the solid line in FIG. 4.

The rotating drum 301 is decelerated, and the tire is rotated at 60 [rpm] (FIG. 4: S205 (9 to 11 [sec])). Then the fluctuation of the loads received by the tire C is detected by the load cells 501 and 502 (FIG. 4: S206 (11 to 14 [sec])). The uniformity measurement method from the load fluctuations is similar to that used in the first embodiment, so an explanation of it is omitted here.

Next, rotation of the tire and the rotating drum 301 is temporarily stopped, the rotational direction of the tire and the rotating drum 301 is reversed, and the tire is rotated at 60 [rpm] (FIG. 4: S207 (14 to 15 [sec])). Next, warm-up operation is performed (FIG. 4: S208 (15 to 17 [sec])). Next, the fluctuations of the load received by the tire are detected by the load cells 501 and 502 (FIG. 4: S209 (17 to 20 [sec])), and the uniformity is calculated based on the detected load fluctuations. Next, the tire and the rotating drum 301 are decelerated (FIG. 4: S210 (20 to 21 [sec]), and the rotation is stopped (FIG. 4: S211 (21 [sec])).

As described above, according to this embodiment, during the uniformity test it is possible to measure a value that can be regarded as equivalent to the dynamic unbalance by decreasing the pressing force by which the rotating drum 301 presses against the tire to 50 to 80 [kgf], so that when dynamic balance measurement is necessary, the dynamic balance test can be started immediately without stopping rotation of the tire.

The invention claimed is:

1. A tire uniformity measurement method, comprising the steps of:

mounting a tire on a spindle of a uniformity measurement apparatus;

pressing a circumferential surface of a rotating drum against the tread surface of the tire with a first pressing force;

rotating the tire around a rotational axis thereof; and computing the forces which the tire acts on first and second planes of the tire while the tire is rotating, the first plane being perpendicular to the rotational axis and in one sidewall side of the tire, the second plane being perpendicular to the rotational axis and in the other sidewall side of teh tire, the forces being computed based on measured values obtained by measuring forces transmitted to the spindle from the tire at first and second positions, the first and second positions having different distances from the direction of the rotational axis.

2. The method according to claim 1, wherein said method computes the components of the forces acting on the first and second planes, respectively, each of the components being in the direction tangential to both the tire and the rotating drum.

3. The method according to claim 1, wherein the first plane includes the one sidewall of the tire and the second plane includes the other sidewall of the tire.

4. The method according to any of claims 1-3, wherein the first pressing force is determined by dividing the weight of a vehicle on which the tire is mounted by the number of tires mounted on the vehicle.

5. The method according to claim 4, wherein said method measures forces by which the tire acts on the first and second planes of the tire while the tire is rotating and the circumferential surface of the rotating drum is pressed against the tread surface of the tire with a second pressing force, the second pressing force producing a frictional force between the rotating drum and the tire, the frictional force being large enough to prevent free rotation of the rotating drum and being smaller than the measurement error of the forces measured at the first and second positions.

6. The method according to claim 5, wherein one of the forces which the tire acts on the first and second planes of the tire exceeds a predetermined value when the circumferential surface of the rotating drum is pressed against the tread surface of the tire with the first pressing force, the pressing force with which the circumferential surface of the rotating drum is pressed against the tread surface of the tire is changed into the second pressing force, and the forces which the tire acts on the first and second planes of the tire are measured.

7. The method according to any of claims 1-3, wherein a calibration is performed on the uniformity measurement apparatus using the result of the measurement of the forces at the first and second positions when a predetermined weight is attached at a predetermined position on the first plane of a balanced tire and when the predetermined weight is attached at a predetermined position on the second plane of a balanced tire.

8. A tire uniformity measurement apparatus, comprising:
a spindle for rotating a tire around a rotational axis thereof;
a rotating drum pressed against the tread of the tire with a first pressing force, the rotating drum being adapted to rotate around the rotational axis thereof as the tire rotates;
a sensor for measuring a force transmitted from the tire to said spindle, the force being measured at a first position and a second position, the first and second positions having different distances from the tire in the rotational axis direction; and
a computing means for computing the forces by which the tire acts on first and second planes, the force on the first plane being perpendicular to the rotational axis and in one sidewall side of the tire, the force on the second plane being perpendicular to the rotational axis and in the second sidewall side of the tire, the computing being performed based on the results of measurements by said sensor.

9. The apparatus according to claim 8, wherein said computing means computes the components of the forces acting on the first and second planes, respectively, each of the components being in the direction tangential to both of tire and the rotating drum.

10. The apparatus according to claim 8, wherein the first plane includes the one sidewall of the tire and the second plane includes the other sidewall of the tire.

11. The apparatus according to claim 8, wherein the first pressing force is determined by dividing the weight of a vehicle on which the tire is mounted by the number of tires mounted on the vehicle.

12. The apparatus according to any of claims 8-11, wherein said apparatus measures forces by which the tire acts on the first and second planes of the tire while the tire is rotating and the circumferential surface of said rotating drum is pressed against the tread surface of the tire with a second pressing force, the second pressing force producing a friction force between said rotating drum and the tire, the frictional force being large enough to prevent free rotation of said rotating drum and being smaller than the measurement error of the forces measured at the first and second positions.

13. The apparatus according to claim 12, wherein one of the forces which the tire acts on the first and second planes of the tire exceeds a predetermined value when the circumferential surface of said rotating drum is pressed against the tread surface of the tire with a first pressing force, the pressing force with which the circumferential surface of a rotating drum is pressed against the tread surface of the tire is changed into the second pressing force, and the forces which the tire acts on the first and second planes of the tire are measured.

14. The apparatus according to any of claims 8-11, further comprising a tire cutting means for cutting the tire so that the amplitude of fluctuation of the force by which the tire acts on the first plane and the amplitude of fluctuation of the force by which the tire acts on the second plane are decreased, the forces being measured when said rotating drum is pressed against the tread of the tire with the first pressing force.

15. The apparatus according to claim 12, further comprising a tire cutting means for cutting the tire so that the amplitude of fluctuation of the force by which the tire acts on the first plane and the amplitude of fluctuation of the force by which the tire acts on the second plane are decreased, the forces being measured when said rotating drum is pressed against the tread of the tire with the second pressing force.

16. The apparatus according to any of claims 8-11, further comprising a marking means for marking the position at which the tire should be cut and the amount by which it should be cut so that the amplitude of fluctuation of the force by which the tire acts on the first plane and the amplitude of fluctuation of the force by which the tire acts on the second plane will be decreased, the forces being measured when said rotating drum is pressed against the tread of the tire with the first pressing force.

17. The apparatus according to claim 12, further comprising a marking means for marking the position at which the tire should be cut and the amount by which it should be cut so that the amplitude of fluctuation of the force by which the tire acts on the first plane and the amplitude of fluctuation of the force by which the tire acts on the second plane will be decreased, the forces being measured when said rotating drum is pressed against the tread of the tire with the second pressing force.

* * * * *